US007150847B2

(12) United States Patent
Chapplear et al.

(10) Patent No.: US 7,150,847 B2
(45) Date of Patent: Dec. 19, 2006

(54) STAGED, SEQUENTIALLY SEPARATED INJECTION MOLD

(75) Inventors: William E. Chapplear, Dayton, OH (US); Kevin R. Harrison, New Madison, OH (US); Andrew J. Moorhead, Mississauga (CA); Charles A. Webster, Sugar Grove, IL (US)

(73) Assignees: Accurate Mold USA, Ltd., Vandalia, OH (US); West Pharmaceutical Services, Inc., Montgomery, PA (US)

( * ) Notice: Subject to any disclaimer, the term of this patent is extended or adjusted under 35 U.S.C. 154(b) by 319 days.

(21) Appl. No.: 10/477,908

(22) PCT Filed: May 15, 2002

(86) PCT No.: PCT/US02/15388

§ 371 (c)(1),
(2), (4) Date: Nov. 13, 2003

(87) PCT Pub. No.: WO02/092319

PCT Pub. Date: Nov. 21, 2002

(65) Prior Publication Data

US 2004/0145084 A1    Jul. 29, 2004

(51) Int. Cl.
*B29C 45/44* (2006.01)
(52) U.S. Cl. .................. 264/318; 264/328.1; 264/334; 425/556; 425/DIG. 58
(58) Field of Classification Search ................. 264/318, 264/334, 335, 328.1; 425/556, 809, DIG. 58
See application file for complete search history.

(56) References Cited

U.S. PATENT DOCUMENTS

| | | | |
|---|---|---|---|
| 3,020,594 A | * | 2/1962 | Makowski ................. 264/318 |
| 3,247,548 A | | 4/1966 | Fields et al. |
| 4,456,214 A | | 6/1984 | Ruck et al. |
| 4,465,651 A | * | 8/1984 | Godschalk et al. ......... 264/161 |
| 4,526,282 A | | 7/1985 | Dutt et al. |
| 4,541,605 A | | 9/1985 | Kubota et al. |
| 4,541,795 A | | 9/1985 | Cole |
| 4,552,328 A | | 11/1985 | Dutt et al. |
| 4,806,301 A | | 2/1989 | Conti |
| 4,919,608 A | | 4/1990 | Catalanotti et al. |
| 4,983,346 A | | 1/1991 | Curliss et al. |
| 5,037,290 A | * | 8/1991 | Curliss et al. .............. 425/556 |
| 5,114,655 A | | 5/1992 | Cole |
| 5,114,659 A | | 5/1992 | Krall |
| 5,133,486 A | | 7/1992 | Moore et al. |
| 5,217,731 A | | 6/1993 | Fallent |
| 5,340,304 A | | 8/1994 | Nakamura |

(Continued)

*Primary Examiner*—Jill L. Heitbrink
(74) *Attorney, Agent, or Firm*—Brinks Hofer Gilson & Lione

(57) ABSTRACT

A staged, sequentially separated injection mold (40) for forming a container spout (14) having a peripheral flange (18), a generally cylindrical sidewall (20), a removable panel (30) fixed within the sidewall, and a pull ring (32) connected to the removable panel. The mold includes a base (42), and a first element (44) coupled to the base including a gate (45). A core plate (60) movable with respect to the base, and a core element (62) confronting the first mold element. A sleeve (76) surrounds the core element having a channel (84) to define the pull ring. The sleeve moves with respect to the core element to permit release of a molded pull ring. A stripper ring (96) surrounds the sleeve with an edge (98) positioned contiguous to the sleeve outward facing surface, the stripper ring being movable along the sleeve.

21 Claims, 7 Drawing Sheets

U.S. PATENT DOCUMENTS

| | | |
|---|---|---|
| 5,368,469 A | 11/1994 | Ekkert |
| 5,403,179 A | 4/1995 | Ramsey |
| 5,470,221 A | 11/1995 | Gaiser |
| 5,540,582 A | 7/1996 | Catalanotti et al. |
| 5,735,426 A | 4/1998 | Babcock et al. |
| 5,736,172 A | 4/1998 | Urmston |
| 5,820,807 A | 10/1998 | Urmston |
| 5,915,574 A | 6/1999 | Adams et al. |
| 5,957,312 A | 9/1999 | Adams et al. |
| 6,179,147 B1 | 1/2001 | Mogard et al. |
| 6,231,491 B1 | 5/2001 | Adams et al. |
| 6,287,106 B1 * | 9/2001 | Learn et al. ................ 425/556 |
| 6,390,342 B1 | 5/2002 | Mabee |
| 6,464,096 B1 | 10/2002 | Adams et al. |
| 6,591,999 B1 | 7/2003 | Molin et al. |

* cited by examiner

STAGED, SEQUENTIALLY SEPARATED INJECTION MOLD

BACKGROUND OF THE INVENTION

The present invention is directed generally to staged, sequentially separated injection molds and particularly to molds for forming container spouts having an integral panel sealing the spout and an integral pull ring to facilitate opening the spout by removal of the panel.

Certain types of containers, such as cartons and the like that have a gable-shaped top, employ separately molded plastic spouts with threaded closures. Such cartons will be recognized as those containers in which quarts, liters, and half-gallons of milk or juice are packaged. The spouts are injection molded to include a removable integral panel sealing the spout at the time of initial purchase by the consumer. Examples of such an injection molded spout are found in U.S. Pat. Nos. 5,133,486; 5,735,426; 5,915,574; 5,957,312 and 6,179,147. The integral panel is view as a tamper-resistant feature of the closure system that is desired by the public to ensure the safety of the product within the container. The integral panel is joined to the spout by a frangible line, and an integral pull ring is provided to facilitate opening of the spout through removal of the integral panel by tearing the frangible line surrounding the panel. The spout includes a threaded exterior surface and a threaded closure to permit re-closing of the container after partial consumption of the contents.

To mold such spouts in an injection molding apparatus, a steel or other metallic mold of the item to be molded is first made. The mold contains a mold cavity configured to reflect the part to be molded. The mold is periodically openable, or separable, so that the molded part can be removed from the mold cavity. A plastic material, such as polypropylene, polystyrene or the like, is injected, such as by a reciprocating screw arrangement, into the mold. After the material has been allowed to cool, the mold is opened and the molded part is ejected from the mold. The mold can then be closed and used for forming a subsequent part.

The presence of the integral panel and pull ring on the interior of the spout at the time it is initially molded represents a special problem. The ejection of the part from the mold must occur in such a sequence as to preserve the frangible line surrounding the removable panel and the pull ring. This can be accomplished by having the mold include an internal mandrel-like core element or sleeve around which the plastic material is molded to conform to the desired mold shape. The mandrel-like portion must, as part of the mold opening sequence, be removed from the molded part after the part is formed. In some known injection mold apparatus, removing the mandrel-like mold element is typically done by pulling or stripping the molded part from the mandrel as part of the mold opening sequence. This, however, may cause damage to the molded parts, particularly if the parts include threads or pull rings formed therein.

One mold designed for this purpose, disclosed in U.S. Pat. Nos. 5,736,172 and 5,820,807, includes a plurality of concentric, separable telescopic mold elements, and an opening therein defined by one of the base portion and the mold elements for injecting a mold material into the apparatus. The elements are configured such that they can be separated or removed from the mold, from the inner most element outward. This structure is intended to provide sufficient free space for the newly molded part to flex inward as the mold elements are removed thus minimizing the possibility of damage to the molded part. Each of the mold elements includes a mold face, which in part defines a mold cavity, and flange portions opposite of their respective mold faces. The mold also includes a movable, ball bearing type to facilitate opening the mold for removal of the molded container spout. The mold apparatus also includes two intermediate mold elements positioned between the inner and outer mold elements. Each of the intermediate mold elements includes openings through their respective body portions adapted to receive a movable, locking ball bearing cam member therein.

This combination of separable telescopic mold elements and locking ball bearing cam members is rather complex and less reliable than would be desirable in a manufacturing situation. Thus, there continues to be a need for an injection molding apparatus which permits a staged, sequential separation of the mold to effect withdrawal of mold portions, which separation process eliminates the potential damage to the molded parts during the mold opening process.

SUMMARY OF THE INVENTION

Accordingly, a staged, sequentially separated injection mold of the present invention includes a base, a first mold element coupled to the base including a gate through which plastics material can be injected and a surface at least partially defining a mold cavity for receiving the plastics material. A core plate movable in a first direction with respect to the mold base has a core element fixed to the plate including an end surface confronting the first mold element partially defining the mold cavity. A sleeve surrounds the core element having an end surface confronting the first mold element, an outward facing surface, and an inward facing surface confronting the core element. The inward facing surface includes a channel coupled to the sleeve end surface and a circumferential groove. The sleeve end surface, outward facing surface and channel further defining the mold cavity. After injection of plastic into the mold cavity, the core element, sleeve and stripper ring initially move as a unit in a first direction away from the first mold element. The core element is then retracted within the sleeve by a distance sufficient to expose the channel coupled to the sleeve end surface to permit release of material from the channel.

A set of thread splits confronts the sleeve outward facing surface and the first mold element to further define the mold cavity. The set of thread splits are movable generally orthogonally to the direction of relative movement of the core and cavity plates. An inclined outer surface is included on each of the thread splits and wedge elements are fixed to the mold base. Each wedge element acts between adjacent inclined outer surfaces on adjacent thread splits to force the thread splits toward the confronting sleeve outward facing surfaces upon movement of the core plate toward the mold base. After injection of plastic into the mold cavity, the set of thread splits move away from the outer surface of the sidewall simultaneously with the moving of the core element, sleeve and stripper ring as a unit away from the first mold element. Stops are fixed to the stripper plate for limiting the movement of the thread splits away from the confronting sleeve outward facing surfaces.

A stripper ring surrounding the sleeve includes an edge positioned contiguous to the sleeve outward facing surface. The stripper ring edge includes an arcuate portion immediately adjacent to the thread splits partially defining the mold cavity. The stripper ring is movable along the sleeve to facilitate removal of material from the sleeve outward facing surface. A stripper plate coupling means couples the stripper plate to the core plate for limiting the relative movement between the stripper plate and core plate. A sleeve support plate is fixed to the sleeve and coupling means couple the sleeve support plate to the core plate for delayed movement with respect to the core plate. After the sleeve support plate has been moved by a distance sufficient to remove the sleeve from within the container spout sidewall and to remove the pull ring from the channel on the inside surface of the sleeve, the sleeve support plate is advanced relative to the stripper plate to cause the sleeve end surface to contact the pull ring and thereby separate the container spout from the stripper ring.

The structure of a mold of the present invention allows for a less complex set of relative movements betweens the various elements of the mold to permit release of the molded article and return of the mold to a position suitable to receive injected plastics. The less complex movements allows for faster and more reliable operation of the mold as compared to existing molds intended to create similar molded articles. Some of the simplicity comes from having certain elements of the mold perform two functions. For example, the set of thread splits confronting the sleeve outward facing surface to define the thread formation on the outer surface of the sidewall also cooperates with the first mold element to define the flange. Likewise, the stripper ring surrounding the sleeve to facilitate removal of the molded sidewall portion of the spout from the sleeve also has an edge positioned contiguous to the sleeve outward facing surface with an arcuate portion immediately adjacent to the thread splits at least partially defining the lip of the sidewall.

These and other features and advantages of the present invention will become apparent to those skilled in the art from a consideration of the following description of a preferred embodiment of the present invention that references the accompanying figures illustrating the best mode of the invention.

DESCRIPTION OF THE PREFERRED EMBODIMENT

Figure 1:
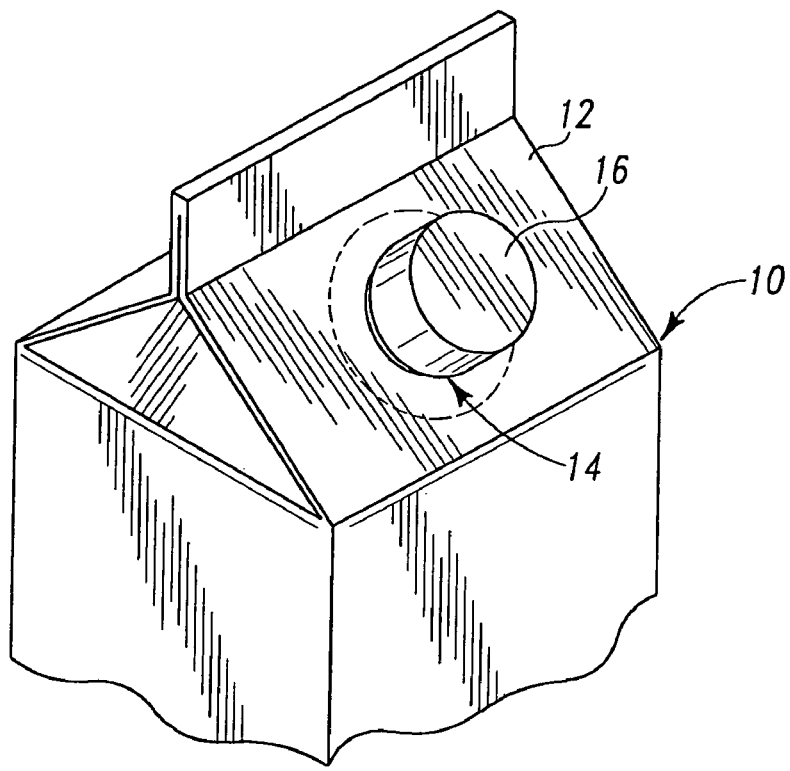
FIG. 1 is a perspective view of an exemplary container spout that can be formed using the staged, sequentially separated injection mold, in accordance with the principles of the present invention, the spout being illustrated affixed to a gable top container.

FIG. 1 shows a container 10 that has come into widespread use having a gable top 12 including a spout 14 capped with a closure 16 for resealing the container 10 after initial opening. The spout 14 is shown in greater detail in FIG. 2 to have a peripheral flange 18. A generally cylindrical sidewall 20 extends perpendicularly from an inner perimeter 22 of the flange 18 to a lip 24. A closure engaging formation such as a thread 26 is formed on the outer surface 28 of the sidewall 20, which interacts with a corresponding internal thread (not shown) on the closure 16. It will be appreciated that the closure engaging formation 26 could be a snap ring near the lip 24 for interaction with a corresponding snap-on cap rather than the closure 16 with an internal thread. A removable panel 30 is integrally formed within the sidewall 20 forming a tamper indicating seal that can be visually inspected by a consumer of the contents of the container prior to initiating use. A pull ring 32 is connected to the removable panel 30 by a stem portion 34 to permit easy removal of the panel 30 by the consumer. By merely pulling on the pull ring 32, the consumer causes a rupture to develop along a generally circular line of weakness 36 at the periphery of the removable panel 30. It will be recognized by those skilled in the art that the various elements of the spout 14 are not easily formed using an injection mold.

A mold 40, constructed according to the present invention for the purpose of forming the spout 14, is shown in FIGS. 3–8. While the figures only illustrate a single set of mold elements capable of forming a single spout at one time, in actual practice, the mold 40 can comprise many such sets of mold elements so that as many as 96, or even more, spouts 14 can be formed simultaneously. The illustration of merely those mold elements necessary to form a single spout at one time is for the purpose of clarity and should not be considered as limiting in any way.

Figure 4:
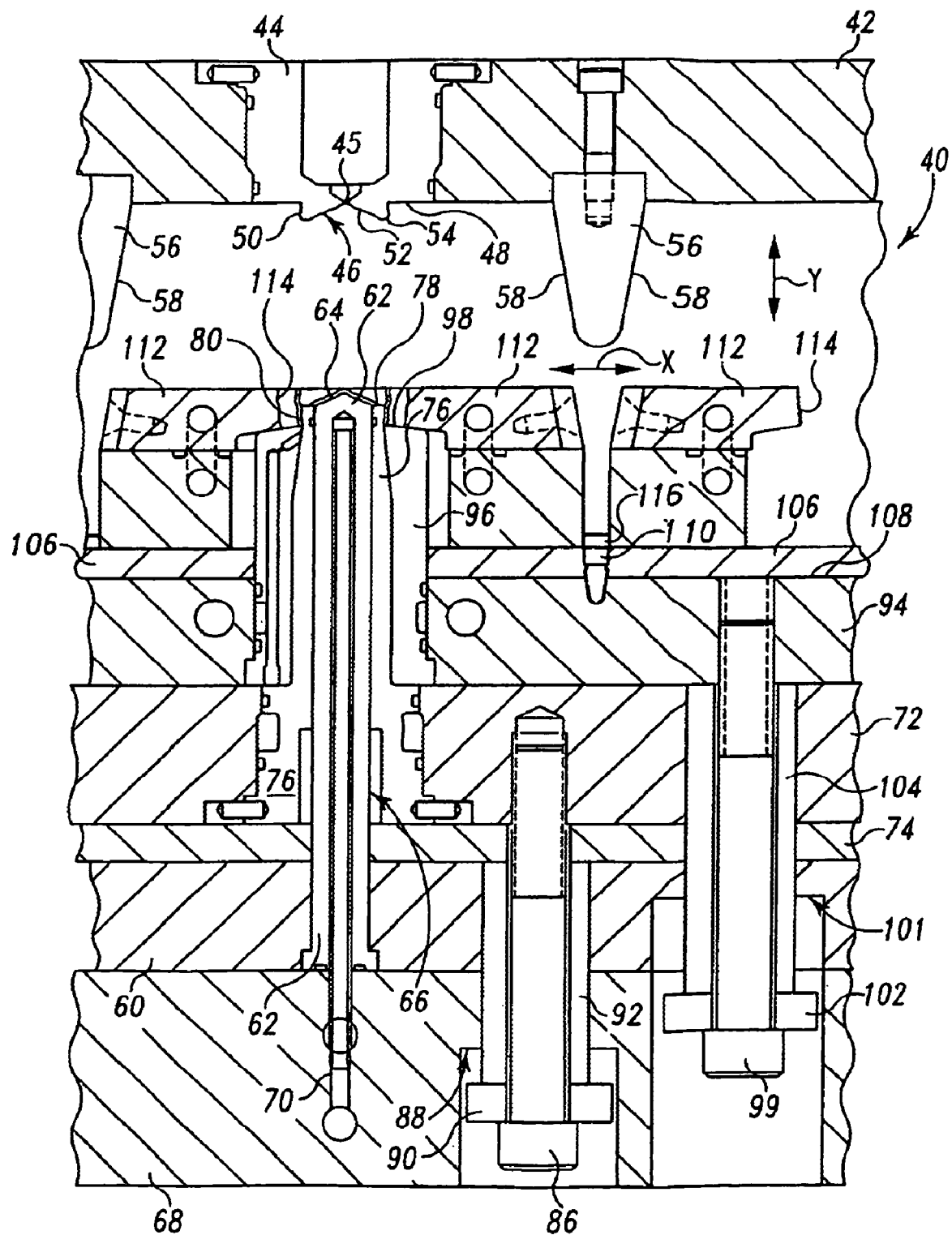
FIG. 4 is a cross-sectional view similar to that of FIG. 3 with the mold moved to an open position with the thread splits retracted away from the molded spout.

The mold 40 includes a mold base 42. A first mold element 44 is coupled to the base 42 and includes a gate 45 through which plastics material can be injected The first mold element 44 also includes a surface 46 partially defining a mold cavity 47 for receiving the plastics material, the mold cavity 47 having the shape of the spout 14. The surface 46 of the first mold element 44 is configured to form the obverse surface of the spout 14 from that shown in FIG. 2. As shown in FIG. 4, the surface 46 of the first mold element 44 includes a first portion 48 defining a lower surface of flange 18, a second portion 50 defining a inner surface of the cylindrical sidewall 20 below the removable panel 30, a third portion 52 defining the lower surface of the removable panel 30, and a ridge 54 at the junction of the second and third portions defining the circular line of weakness 36. A pair of camming wedges 56 are fixed to the mold base 42 on each side of the first mold element 44 to project generally perpendicularly away from the mold base 42. Each camming wedge 56 includes a pair of inclined surfaces 58, the function of which will become apparent from the discussion below.

The mold 40 also includes a first core plate 60 that is reciprocally movable in direction Y with respect to the mold base 42. A core element 62 is fixed to the core plate 60 to project toward the first mold element 44. The core element 62 includes an end surface 64 that confronts a central part of the third portion 52 of surface 46 of the first mold element 44 and defines an inner portion of the upper surface of the removable panel 30. The core element 62 also includes a cylindrical outer surface 66. A second core plate 68 is fixed to the first core plate 60, and includes lines 70 for handling cooling fluids, such as chilled water, supplied to the interior of the core element 62.

The mold 40 also includes a sleeve support plate 72 separated from the first core plate 60 by a core retaining plate 74. The core retaining plate 74 is fixed to the sleeve support plate 72. A sleeve 76 is fixed to the sleeve support plate 72 so as to surround the core element 62. As shown in FIG. 4, the sleeve 76 has an end surface 78 that confronts that portion of surface 46 of the first mold element 44 to define the perimetral portion of the removable panel 30. The sleeve 76 also has an outward facing surface 80 that includes a forward portion defining the inner surface of the sidewall 20 of the spout 14. An inward facing surface 82 of the sleeve 76 confronts the core element 62 and includes a channel 84 coupled to the sleeve end surface 78 that defines the pull ring 32 and stem portion 34 of the spout 14. The sleeve 76 is movable with respect to the core element 62 to permit release of material from the channel 84 as explained below in connection with the steps of the molding process illustrated by FIGS. 5 and 6, however, the sleeve 76 is limited in its movement. A fastener 86 extends through the core retaining plate 74, the first core plate 60 and the second core plate 68, and is fixed to the sleeve support plate 72. The second core plate 68 includes a shoulder 88 that confronts a stop 90 on the fastener 86 that limits the relative movement between the sleeve support plate 72 and the second core plate 86. The faster 86 is surrounded by a bushing 92 that limits the travel of the plates 60, 68, 72 and 74 during their relative movement.

The mold 40 also includes a stripper plate 94. A stripper ring 96 is fixed to the stripper plate 94 so as to surround the sleeve 76. The stripper ring 96 includes an edge 98 positioned contiguous to the sleeve outward facing surface 80. As shown in FIG. 6, the edge 98 includes a portion 100 that defines the lip 24 of the spout 14. The stripper plate 94 and stripper ring 96 are movable relative to the sleeve 76 to facilitate removal of material from the sleeve outward facing surface 80 as explained below in connection with the steps of the molding process illustrated by FIGS. 5 through 7, however, the stripper ring 96 is limited in its movement. A fastener 99 extends through the first core plate 60, core retaining plate 74, and the sleeve support plate 72, and is fixed to the stripper plate 94. The first core plate 60 includes a shoulder 101 that confronts a stop 102 on the fastener 99 that limits the relative movement between the stripper plate 94 and the first core plate 60. The fastener 99 is surrounded by a bushing 104 that limits the travel of the plates 60, 72, 74 and 94 during their relative movement.

Wear plate 106 is fixed to a front surface 108 of the stripper plate 94 by fastener 110. Thread splits 112 move along the surface of wear plate 106 for lateral movement in the direction X. The thread splits 112 include a thread-defining surface 114 that confronts the sleeve outward facing surface 80 and the second portion 50 of the first mold element 44 to define the threaded outer surface 20 of the spout 14. The thread splits 112 are movable by a biasing means or by a cam and cam follower combination (not shown) between the position shown in FIG. 3 and the position shown in FIGS. 4–8. The thread splits 112 include an inclined outer surface 118 intended to be engaged by the inclined surfaces 58 of camming wedges 56 to force the thread splits 112 toward the confronting sleeve outward facing surfaces 80 upon movement of the first core plate 60 toward the mold base 42. The head 116 of fastener 110 is dimensioned to act as a stop to limit the outward lateral movement of the thread splits 112.

Figure 2:
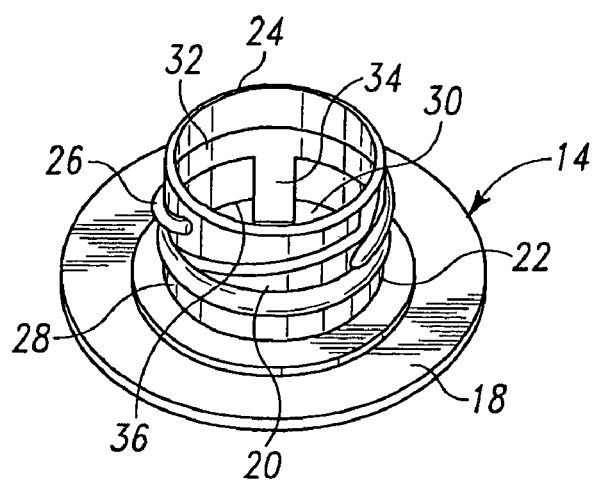
FIG. 2 is a perspective view of a spout that can be formed in a staged, sequentially separated injection mold of the present invention.
Figure 3:
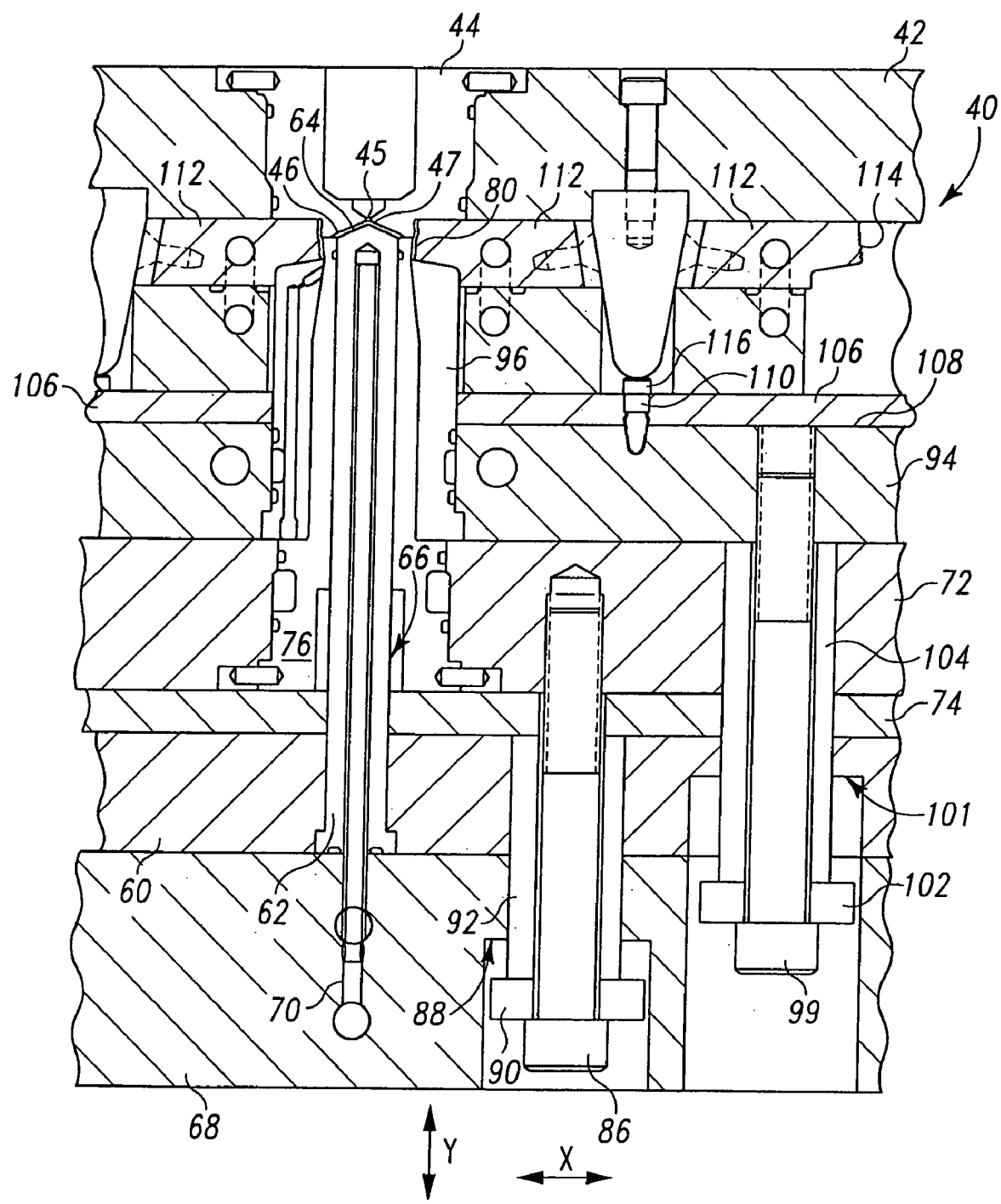
FIG. 3 is a cross-sectional view of the staged, sequentially separated injection mold apparatus of the present invention for making the spout shown in FIGS. 1 and 2, with the mold shown in the fully closed position.

In operation, a container spout 14 as shown in FIGS. 1 and 2 is formed in mold 40 by injecting a molten plastic through gate 45 while the mold is situated in a closed position as shown in FIG. 3. After an initial period of time sufficient for in molten plastic to cool to a form-stable state, the core element 62, sleeve 76 and stripper ring 96 are moved as a unit to an open position as shown in FIG. 4 which has the effect of removing the molded spout 14 from contact with the surface 46 of the first mold element 40. Simultaneously with this movement, the thread splits 112 are caused to move outward away from the outer surface 28 of the sidewall 20 to expose the newly formed threads 26.

Figure 5:
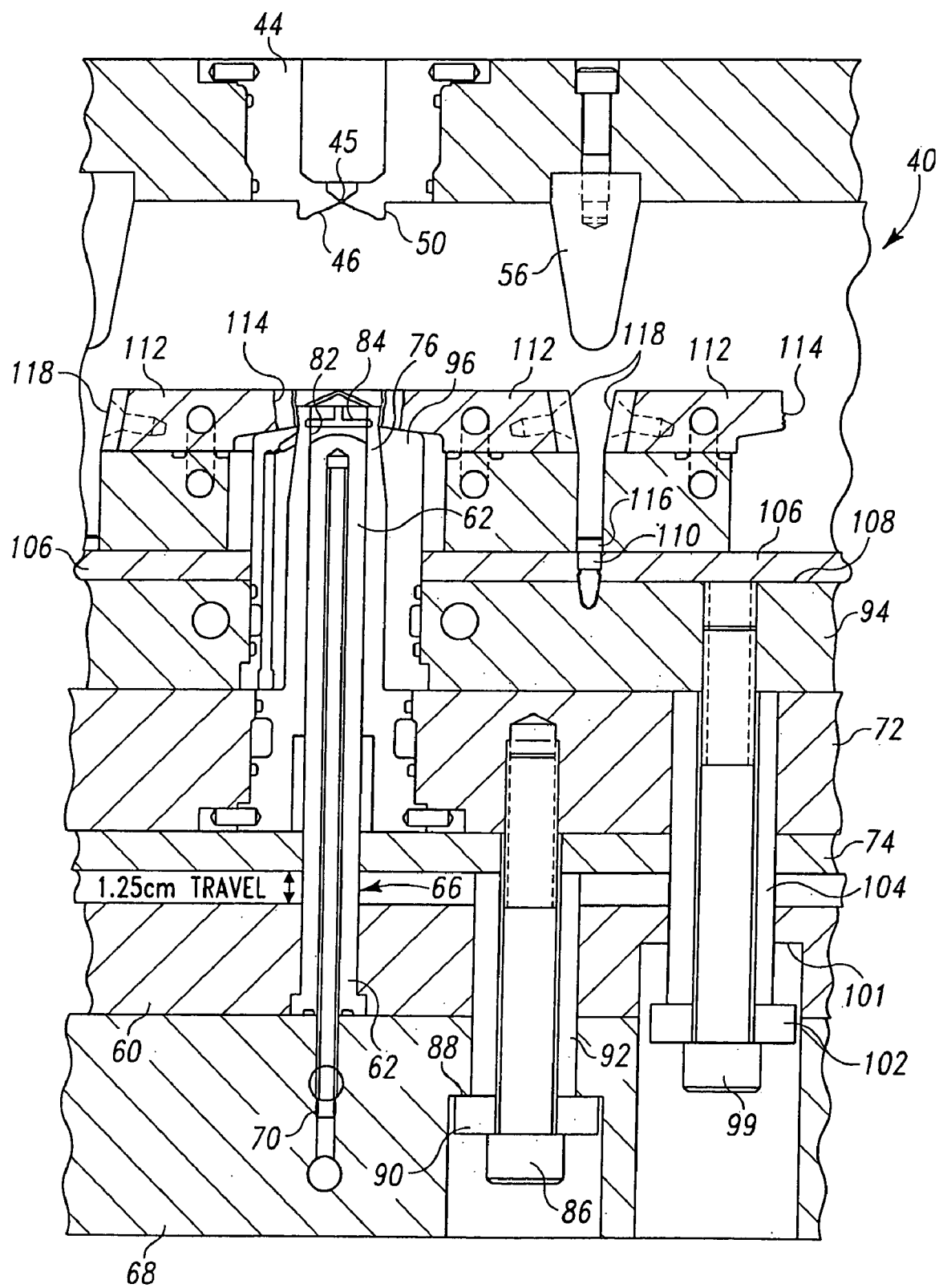
FIG. 5 is a cross-sectional view similar to that of FIG. 4 with the mold core plate moved even further open so that the core is moved within the sleeve to a position that will allow the pull ring to be removed.
Figure 6:
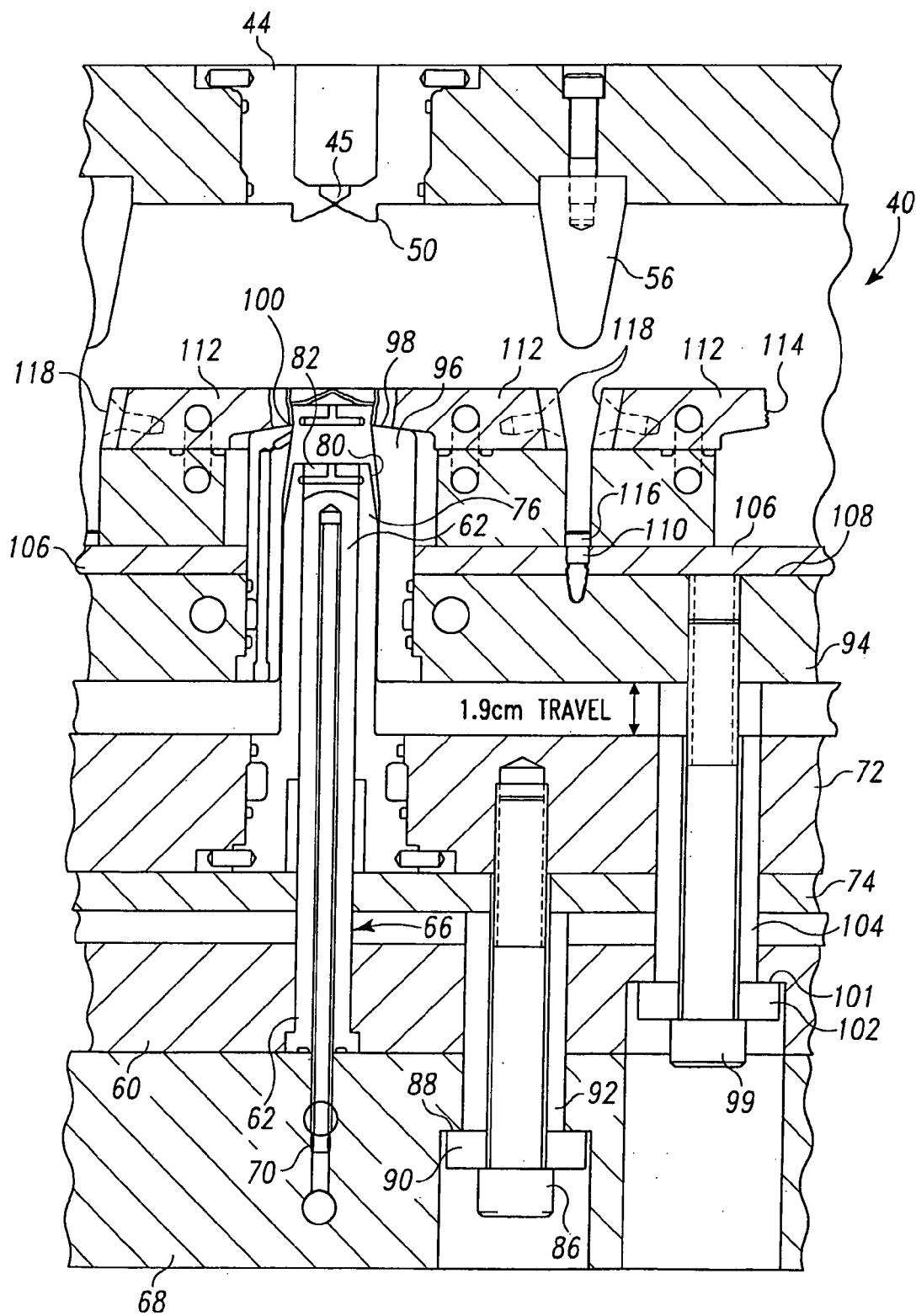
FIG. 6 is a cross-sectional view similar to that of FIG. 5 with the mold sleeve support plate moved to a further open position thereby causing the sleeve to be withdrawn from the molded article that is held by the stripper ring.

Next, the first and second core plates 60 and 68 move away from the sleeve support plate 72 and core retaining plate 74 by a distance limited by the abutment of stop 90 and shoulder 88, typically about 1.25 cm, as shown in FIG. 5. This causes the core element 62 to be withdrawn from within the sleeve 76 by a distance sufficient to expose the channel 84 coupled to the sleeve end surface 78 that contains the pull ring 32 and stem portion 34 of the spout 14. The rearward movement of the first and second core plates 60 and 68 continues until the shoulder 101 on the first core plate 60 abuts stop 102 surrounding fastener 99, as shown in FIG. 6. This causes the sleeve support plate 72 to be separated from the stripper plate 94 by a distance, typically about 1.9 cm, sufficient to withdraw sleeve outward facing surface 80 from within the sidewall 20 of spout 14 so that the spout is now held by edge portion 100 of the stripper ring 96 that defines the lip 24 of the spout 14.

Figure 7:
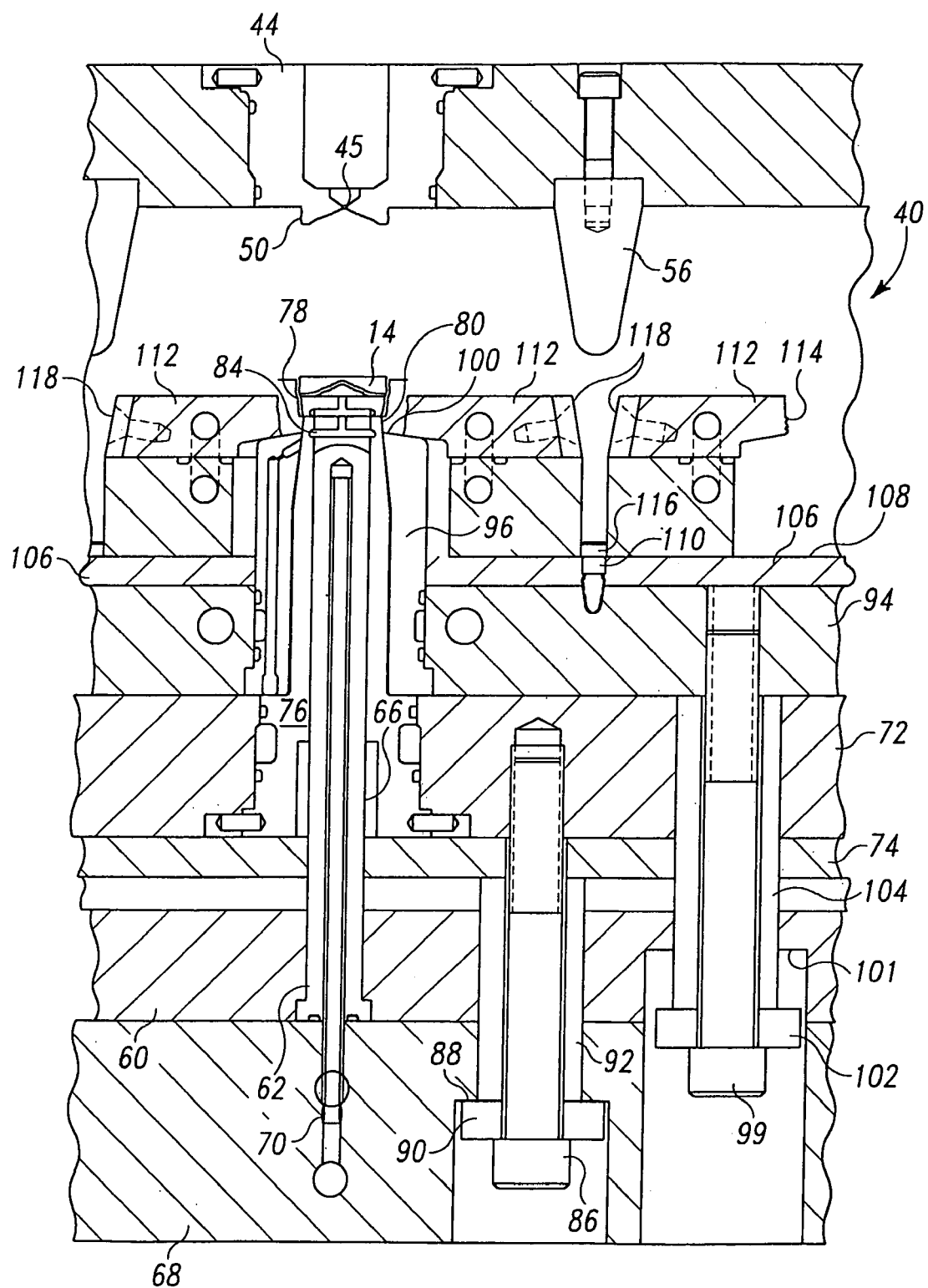
FIG. 7 is a cross-sectional view nearly identical to that of FIG. 5 with the mold sleeve support plate having been returned to its former position thus causing the sleeve to move back inside the stripper ring to force the molded spout out of contact with the stripper ring.
Figure 8:
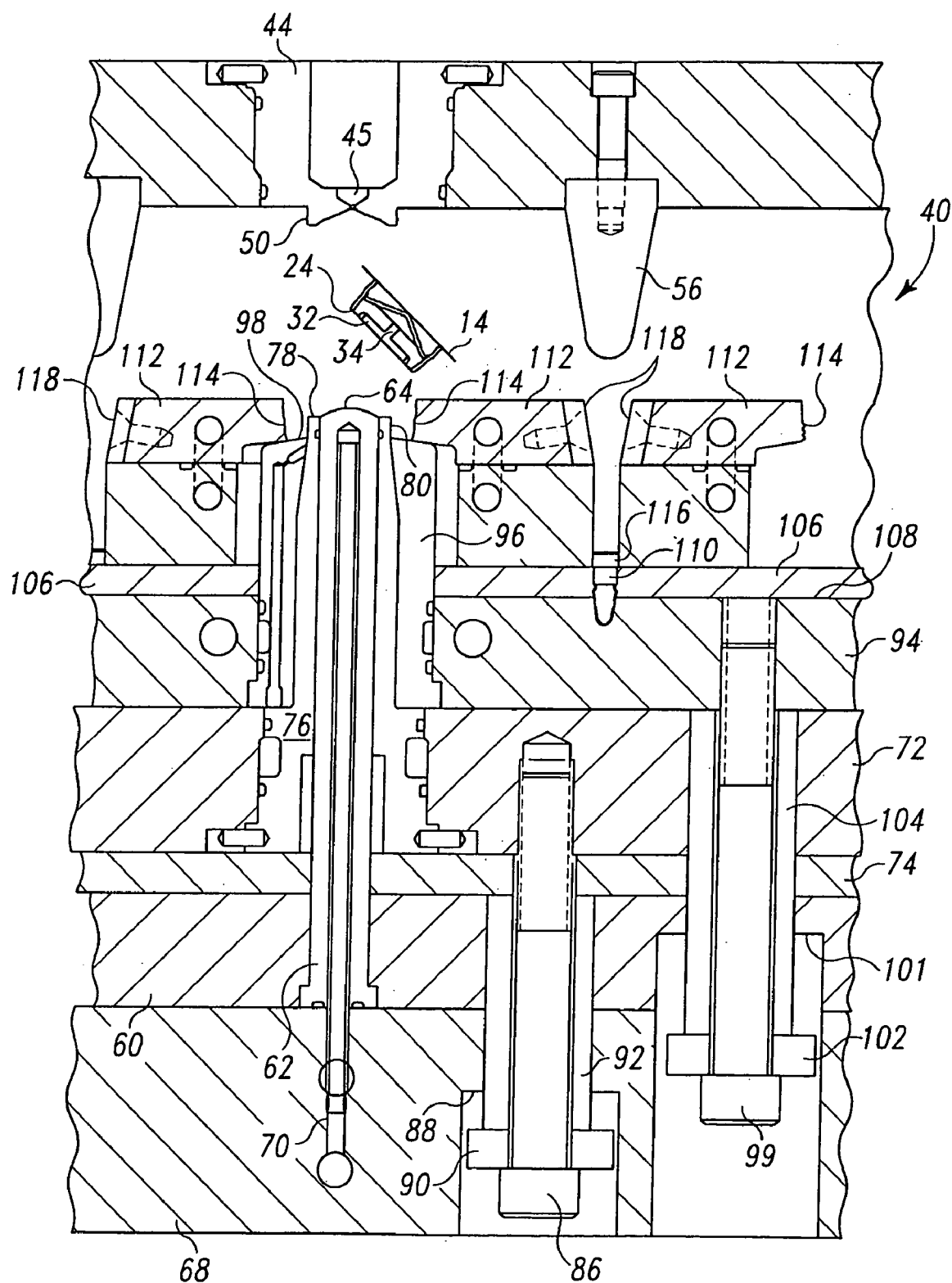
FIG. 8 is a cross-sectional view nearly identical to that of FIG. 4 with the core plate having been returned to its former position, thus completing the ejection of the molded article from the mold in preparation for the mold to close to the position shown in FIG. 3 ready again to accept injected plastic.

Next, the sleeve support plate 72 is moved forward until it abuts the stripper plate 94 as shown in FIG. 7. This causes the sleeve end surface 78 to contact the pull ring 32 and push the molded spout 14 free from the stripper ring 96, thereby providing the molded spout 14 with some momentum so that it will be ejected from the mold 40. A optional air channel can be included to provide an air blast between the molded spout 14 and one or more of the stripper ring 96, core element 62, and sleeve 76 to assist in the ejection of the spout 14. Thereafter the core plates 60 and 68 are moved to abut the sleeve support plate 72 as shown in FIG. 8. The core plates 60 and 68, sleeve support plate 72 and stripper plate 94 are then moved as a unit to return to the closed position shown in FIG. 3. This causes the inclined surfaces 58 on camming wedges 56 to force the thread splits toward the outward facing surfaces 80 of sleeve 76 and second portion 50 of surface 46 of the first mold element 44, thereby defining a closed cavity 47 situated to receive the next shot of molten plastic.

The structure of mold 40 is illustrative of the present invention in that it allows for a very simple set of relative movements betweens the various elements of the mold to permit release of the molded article 14, and then a return of the mold to a position suitable to receive a next shot of injected plastics. The simple movements of the mold 40 allow for a faster and more reliable operation of the mold as compared to existing molds intended to create similar molded articles. Various modifications of the invention in addition to those shown and described herein will become apparent to those skilled in the art from the foregoing description and accompanying drawings. Such modifications are intended to fall within the scope of the appended claims.

What is claimed is:

1. A method for forming a container spout (14) having a peripheral flange (18), a generally cylindrical sidewall (28) extending from an inner perimeter (22) of the flange to a lip (24), a closure coupling formation (26) on an outer surface of the sidewall (28), a removable panel (30) fixed within the sidewall (28), and a pull ring (32) connected to the removable panel, the method comprising the steps of:

providing a first mold element (44) including a gate (45) through which plastics material can be injected and a surface (46) at least partially defining the peripheral flange (18) and removable panel (30), providing a core element (62) including an end surface (64) confronting the first mold element (44) to partially define the removable panel, providing a sleeve (76) surrounding the core element (62) having an end surface (78) confronting the first mold element (44) to partially define the removable panel, an outward facing surface (80) at least partially defining the sidewall, and an inward facing surface (82) confronting the core element, the inward facing surface including a channel (84) coupled to the sleeve end surface (78) at least partially defining the pull ring, providing a stripper ring (96) surrounding the sleeve having an edge (88) positioned contiguous to the sleeve outward facing surface (80) and an arcuate portion (100) immediately adjacent to the sleeve at least partially defining the lip (24) of the sidewall, moving the core element (62), sleeve (76) and stripper ring (96) as a unit in a first direction (Y) away from the first mold element (44), retracting the core element (62) within the sleeve (76) by a distance sufficient to expose the channel (84) coupled to the sleeve end surface (78) at least partially defining the pull ring, withdrawing the sleeve (76) relative to the stripper ring (96) by a distance sufficient to remove the sleeve from within the container spout sidewall (28) and to remove the pull ring (32) from the channel on the inside surface of the sleeve (76). and advancing the sleeve (76) relative to the stripper ring (96) sufficient to cause the sleeve end surface (78) to contact the pull ring (32) and thereby separate the container spout (14) from the stripper ring.

2. The method of claim 1 further comprising the steps of:

providing a set of thread splits (112) confronting the sleeve outward facing surface (80) and the first mold element (44) to further define the flange (18) and the closure coupling formation (26) on the outer surface of the sidewall (28) and the mold cavity, and allowing the set of thread splits (112) to move in a second direction (X) generally orthogonal to the first direction (Y) away from the outer surface of the sidewall (28) simultaneously with the moving of the core element (62), sleeve (76) and stripper ring (96) as a unit in a first direction (Y) away from the first mold element (44).

3. The method of claim 1 or 2 further comprising the steps of providing an outward facing surface (50) on the first mold element (44) defining at least in part an inner surface of the cylindrical sidewall (28) of the container spout (14) and arranging for the part of the inner surface of the cylindrical sidewall (28) of the container spout defined by the outward facing surface (50) on the first mold element to be withdrawn from the first mold element (44) simultaneously with the moving of the core element (62), sleeve (76) and stripper ring (96) as a unit in a first direction (y) away from the first mold element.

4. The method of claim 3 further comprising the step of providing a blast of air against an interior surface of the molded container spout (14) to assist in the ejection of the container spout from the mold (40).

5. A staged, sequentially separated injection mold (40) comprising: a mold base (42) and a first mold element (44) coupled to the base (42) including a gate (45) through which plastics material can be injected and a first surface (46) at least partially defining a mold cavity (47) for receiving the plastics material; a core plate (60) movable in a first direction (Y) with respect to the mold base (42) and a core element (62) fixed to the core plate (60), the core element (62) including an end surface (64) confronting the first mold element (44) and at least partially defining the mold cavity (47); a sleeve (76) surrounding the core element (62) having an end surface (78) confronting the first mold element (44), an outward facing surface (80), and an inward facing surface (82) confronting the core element (62), the sleeve end surface (78) and outward facing surface (80) further defining the mold cavity (47), and a channel (84) on the inward facing surface (82) of the sleeve (76) coupled to the sleeve end surface (78) further defining the mold cavity (47), the sleeve (76) being movable in said first direction (Y) with respect to the core element (62) to permit release of material from the channel (84); a set of thread splits (112) confronting the sleeve outward facing surface (80) and the first mold element (44) to further define the mold cavity (47), the set of thread splits (112) being movable in a direction (X) generally orthogonal to the first direction (Y); a stripper ring (96) surrounding the sleeve (76) and including an edge (98) positioned contiguous to the sleeve outward facing surface (80), the stripper ring (96) being movable along the sleeve (76) to facilitate removal of material from the sleeve outward facing surface (80); and a stripper plate (94) fixed to the stringer ring (96), and thread a split supporting means fixed to the thread a splits (112) and coupled to the stripper plate for movement relative to the stripper plate in said second direction (X) and with the stripper plate in said first direction (Y).

6. The injection mold of claim 1 further comprising an inclined outer surface (118) on each of the thread splits (112) and wedge elements (56) fixed to the mold base (42), each wedge element having a pair of similarly inclined surfaces (58) projecting between the adjacent inclined outer surfaces (118) on adjacent thread splits to force the thread splits toward confronting sleeve outward facing surfaces (118) upon movement of the core plate (60) toward the mold base (42).

7. The injection mold of claim 1 further comprising stripper plate coupling means (99) for coupling the stripper plate to the core plate (60) for limiting the relative movement between the stripper plate and core plate.

8. The injection mold of claim 1 further comprising stops (116) fixed to the stripper plate for limiting the movement of the thread splits (112) away from the confronting sleeve outward facing surfaces.

9. The injection mold of claim 1 further comprising a sleeve support plate (72) fixed to the sleeve and coupling means (86) for coupling the sleeve support plate to the core plate (68) for delayed movement with respect to the core plate.

10. The injection mold of claim 1 wherein said channel (84) on the sleeve inward facing surface (76) further comprises a circumferential groove at a fixed distance from said sleeve end surface (78), and a slot leading from the circumferential groove to the sleeve end surface.

11. The injection mold of claim 10 wherein the smallest dimension of the slot leading from the circumferential groove to the sleeve end surface (78) is greater than a smallest dimension of the mold cavity (47) measured between the sleeve end surface (78) and the first surface (46) of the first mold element (44).

12. The injection mold of claim 1 wherein said edge of the stripper ring (92) positioned contiguous to the sleeve further comprises an arcuate portion (100) partially defining the mold cavity (47).

13. The injection mold of claim 1 wherein the first surface (46) of the first mold element (44) defining the mold cavity (47) defines at least in part a peripheral flange (18) and removable panel (30) of a container spout (14).

14. The injection mold of claim 13 wherein the first mold element (44) defining the mold cavity further comprises a surface (50) continuously surrounding the first surface (46) defining at least in part an inner surface of a cylindrical sidewall (28) of the container spout.

15. The injection mold of claim 1 wherein the end surface (64) of the core element (62) defines at least in part a removable panel (30) of a container spout.

16. The injection mold of claim 1 wherein the end surface (78) of the sleeve (76) surrounding the core element (62) defines at feast in part a removable panel (30) of a container spout.

17. The injection mold of claim 16 wherein the end surface (78) of the sleeve (76) defines a line of weakness (36) surrounding the removable panel (30) of the container spout.

18. The injection mold of claim 1 wherein the outward facing surface (80) of the sleeve defines at least in part a cylindrical sidewall (28) of a container spout.

19. The injection mold of claim 1 wherein the channel (84) on the sleeve inward facing surface (82) is connected to a peripheral groove defining a pull ring (32) attached to a removable panel (30) of a container spout.

20. The injection mold of claim 1 wherein a surface (100) adjacent to the stripper ring edge (98) contiguous to the sleeve defines a lip (24) of a container spout (14).

21. The injection mold of claim 1 further comprising a channel in one of the core, stripper ring, or sleeve to provide a blast of air against an interior surface of the molded container spout (14) to assist in the ejection of the container spout (14) from the mold.

* * * * *

UNITED STATES PATENT AND TRADEMARK OFFICE
CERTIFICATE OF CORRECTION

PATENT NO. : 7,150,847 B2
APPLICATION NO. : 10/477908
DATED : December 19, 2006
INVENTOR(S) : William E. Chapplear et al.

It is certified that error appears in the above-identified patent and that said Letters Patent is hereby corrected as shown below:

Column 8
Line 40, delete "stringer" and insert --stripper--.
Line 40, delete "a".
Line 41, delete "a".

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,150,847 B2  Page 1 of 1
APPLICATION NO. : 10/477908
DATED : December 19, 2006
INVENTOR(S) : William E. Chappelear et al.

It is certified that error appears in the above-identified patent and that said Letters Patent is hereby corrected as shown below:

On the Title Page
Item 12
After United States Patent delete "Chapplear" and insert --Chappelear--.

On the Title Page
Item 75
After Inventors delete "Chapplear" and insert --Chappelear--.

Signed and Sealed this

Fourteenth Day of August, 2007

JON W. DUDAS
*Director of the United States Patent and Trademark Office*